MARCELIN & EUDE.
Clarifying Cane Juice.
No. 28,385.  Patented May 22, 1860.
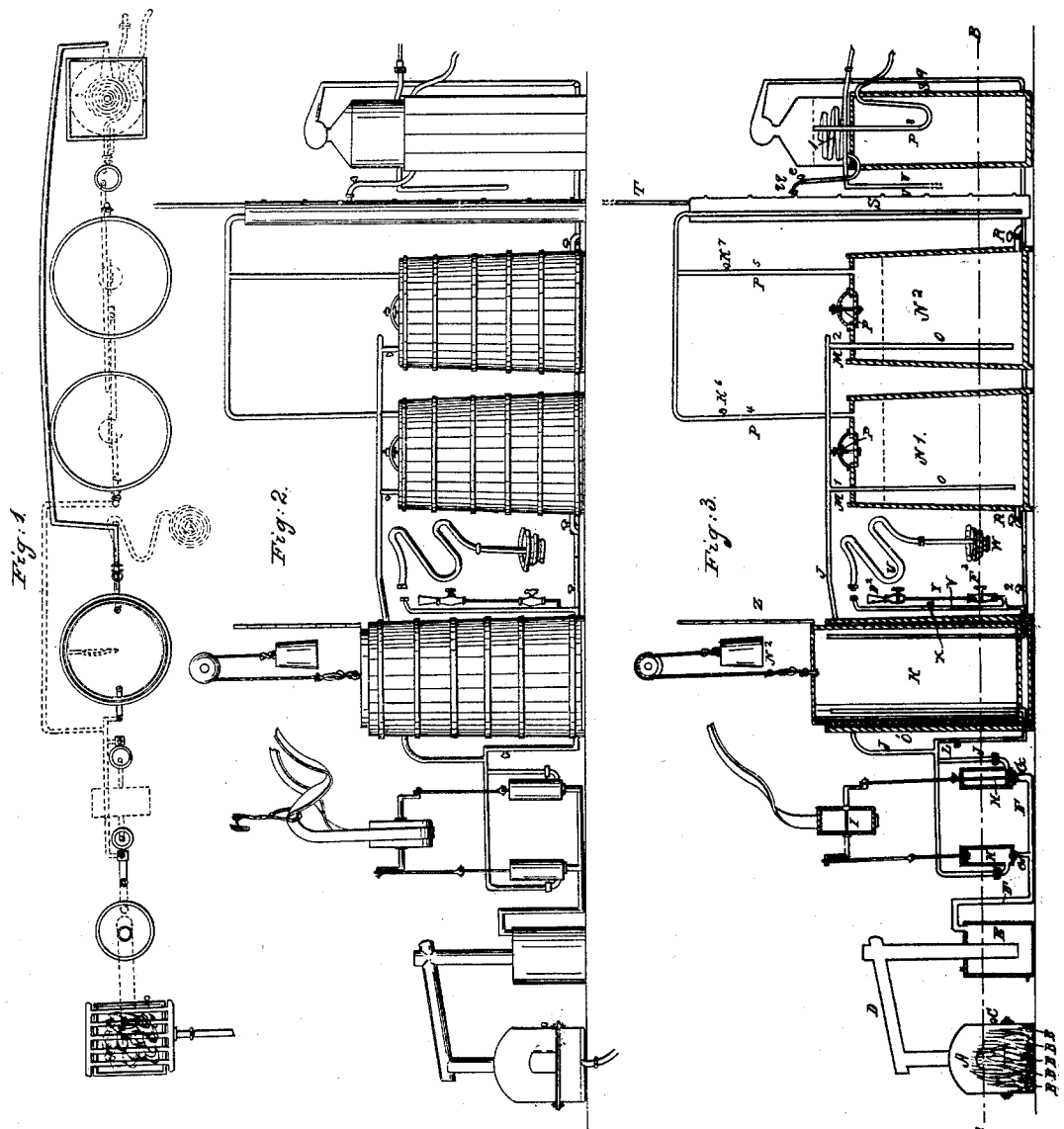

UNITED STATES PATENT OFFICE.

PAUL MARCELIN AND ERNEST EUDE, OF NEW ORLEANS, LA.

IMPROVEMENT IN APPARATUS FOR CLARIFYING CANE-JUICE.

Specification forming part of Letters Patent No. 28,385, dated May 22, 1860.

*To all whom it may concern:*

Be it known that we, P. MARCELIN and E. EUDE, of New Orleans, in the State of Louisiana, have invented new and useful Improvements in Apparatus for the Manufacture of Sulphurous Acid and Bisulphite of Lime; and we do hereby declare that the following is a full and exact description thereof, reference being had to the accompanying drawings, and to the letters of reference marked thereon.

In the manufacture of sulphurous acid and bisulphite of lime and the use of the same in manufacturing sugar, the following considerations are especially important: First, the generation of a rich sulphurous-acid gas with little admixture of atmospheric air; second, a suitable arrangement for purifying the gas, and in connection therewith a system of pumps to cause the gas to flow through the apparatus; third, a convenient apparatus for introducing the gas into the sugar-juice; fourth, an arrangement for forcing the gas into lime-water in order to make bisulphite of lime, in warm climates without the use of ice; fifth, means for evolving the pure sulphurous-acid gas from the solution of bisulphite of lime.

To accomplish the above purposes in an improved manner is the object of our invention.

Our invention consists of an improved apparatus for the manufacture of sulphurous acid or bisulphite of lime, and for using the same in the production of sugar.

In the accompanying drawings, Figure 1 is a plan of our apparatus on the line A B, Fig. 3. Fig. 2 is a side elevation of our apparatus. Fig. 3 is a vertical section of the same.

In the accompanying drawings, A represents a close iron furnace for buring sulphur in order to generate sulphurous-acid gas. At the bottom of this furnace are arranged several steam-tubes, B, for heating the sulphur, and thus promoting the combustion of the latter with little admission of atmospheric air. The amount of air admitted to the furnace is controlled by a regulator, C. (It will be observed that no steam comes in contact with the sulphur or air in the furnace.) Sulphur being placed in this furnace, steam is admitted to the tubes B, and the sulphur is thus heated before it is ignited. By this means the combustion is free from the commencement, and the air in the furnace is exhausted before the fumes of sulphur and the gas begin to escape from the furnace. Thus the combustion is sustained with little admission of air through regulator C, and consequently the sulphurous-acid gas is very rich—about twenty per cent. In this operation no steam is allowed to come in contact with the sulphurous-acid gas, as such contact would generate sulphuric acid, which would corrode the apparatus. The sulphurous-acid gas thus formed escapes from the furnace through pipe D into the washer or purifier E, which is made of sheet-lead, and is partially filled with water. By an arrangement of the pumps H, worked by pulley I, the gas is drawn from the washer through pipes F and G, and forced forward through pipes J, either to the gasometer K or the receivers $N'$ and $N^2$, the cocks L and M being opened or closed at pleasure.

Connected with the gasometer is a tester of usual construction, having a graduated glass tube, Y, and two stop-cocks, $D^2$ and $F^3$, the upper cock being crowned by a funnel. By this instrument, connected with the gasometer K, the purity of the gas in the latter is tested as follows: Open both the stop-cocks of the tester, and let the gas flow from the gasometer K until the air is driven out of the glass tube Y. Then close the cocks and pour water into the funnel crowning the cock $D^2$. Now slowly admit the water to the upper part of the tube Y until the gas ceases to be absorbed by the water. The volume of the tube, filled by the water, as indicated on the scale, will throw the percentage of sulphurous acid in the gasometer, as is well understood by persons familiar with our art. The gasometer is also provided with an injection-tube, W, coupled to the tube V by means of a flexible tube, U. By this arrangement the sulphurous acid may be used directly from the gasometer in the following manner: The tube W being inserted into the cane-juice, and the stop-cock X being opened, the gas will readily escape from the gasometer into the cane-juice, the amount so used being known by the scale or indicator Z, showing how far the gasometer K or its weight $N^2$ moves.

In case it be desirable to make sulphite of lime, the sulphur in the furnace is ignited, as above described, and the pump H is set in operation, the stop-cock L being closed, while cocks M' and M² are left open. Then the sulphurous-acid gas passes into the receivers N' and N², through tubes O, which dip under water, as seen in Fig. 3. These receivers are nearly filled with lime-water, in the usual manner. They are closed, so that a considerable pressure may be made upon the gas, in order to facilitate the combination of the latter with the lime. As the gas is admitted to these receivers, the chemical action generates heat, and would thus prevent the formation of bisulphite of lime of the requisite strength. Such receivers are sometimes cooled by ice or by a worm. To avoid this expense we recommend the admission of gas alternately into each receiver, allowing them time to cool; or the liquor may be drawn off, allowed to cool, and then put again into the receivers, to be further charged with gas. From the tops of these receivers extend two tubes, $P^4$ and $P^5$, having stop-cocks $K^6$ and $K^7$. On opening these cocks the sulphurous-acid gas passes out into the water-column S, which is very high, in order to produce great pressure upon the gas. This column S has several apertures and cocks, $t$, along one side, to show the height of the water and the pressure upon the gas. By means of this water-column we are able to produce very strong bisulphite of lime. Connected with this water-column is an alembic, 1, to which the pipes 2 conduct water. The surplus water flows off from the alembic by tube $R^8$, the flow being regulated by stop-cock $e$. This alembic is heated by a steam-worm, $u$, thus expelling the pure sulphurous-acid gas, which passes down the tube $S^9$ and back to the gasometer K, where it may be introduced to the cane-juice, as above described.

From the preceding description any person skilled in the art will be able to make and use our apparatus. It may be added that the pipes should be of lead, as also the gasometer K, alembic, and water-column. The tanks or receivers may be made of cypress or other wood, well hooped. They are about five feet high, and contain about one hundred and fifty gallons. The hollow cylinders for the pumps may be made of lead, but better of glass, strengthened by sleeves of iron, with plaster-of-paris mortar packed between the glass and the iron sleeve. The pistons may be of copper or brass packed with vulcanized india-rubber.

The chief advantages of our apparatus are, first, the richness of the sulphurous-acid gas, it being about twenty per cent.; second, the facility with which the sulphurous-acid gas is introduced to the cane-juice; third, the convenience of testing the gas before using it, either in the cane-juice or in making bisulphite of lime; fourth, the hydraulic pressure of the water-column, in connection with the forcing-pumps, to produce pressure, and thus to obtain bisulphite of lime of great concentration, being able to make bisulphite of 10° Baumé at a temperature of 72° Fahrenheit, (and without the use of ice;) fifth, the expulsion of sulphurous acid from bisulphite of lime by the alembic and the later injection of said gas into the cane-juice by means of the gasometer and injection-tube.

Having thus fully described our invention, what we claim, and desire to secure by Letters Patent of the United States, is—

1. The combination of the furnace, washer, pumps, gasometer, tester, receivers, water-column, and alembic, the whole being constructed, arranged, and operated substantially as set forth, for the purposes described.

2. The use of the gasometer K and gas-tester Y, in combination with either the pumps H and furnace A or with the alembic 1, substantially in the manner and for the purposes specified.

New Orleans, State of Louisiana, the 12th day of January, 1860.

P. MARCELIN.
E. EUDE.

Witnesses:
A. SAMPSON,
U. C. LE ROY.